United States Patent [19]

Gatsos et al.

[11] 4,301,902

[45] Nov. 24, 1981

[54] COMBINATION VEHICLE SPEED AND DIRECTION CONTROL

[75] Inventors: Stephen L. Gatsos; Jerry A. Gardner, both of Indianapolis, Ind.

[73] Assignee: Indus Wheel Company Div. of Carlisle Corporation, Cincinnati, Ohio

[21] Appl. No.: 72,183

[22] Filed: Sep. 4, 1979

[51] Int. Cl.³ .............................................. B60K 41/24
[52] U.S. Cl. .................................. 192/11; 192/13 R; 192/3.51; 74/473 R; 74/481; 474/1
[58] Field of Search .................... 192/3.63, 3.61, 3.62, 192/3.54, 4 R, 11, 12 R, 13 R, 3.51; 74/471 R, 473 R, 480 B, 480 R, 481, 879, 876; 474/1

[56] References Cited

U.S. PATENT DOCUMENTS

| | | | |
|---|---|---|---|
| 2,219,601 | 10/1940 | Quartullo | 192/3.63 X |
| 2,737,822 | 3/1956 | Morse | 74/480 B X |
| 2,880,832 | 4/1959 | Apel | 192/3.62 |
| 2,957,561 | 10/1960 | Musgrave | 192/4 R X |
| 2,989,134 | 6/1961 | Kamlukin et al. | 74/471 X |
| 3,180,305 | 4/1965 | Gower-Rempel | 74/879 X |
| 3,311,186 | 3/1967 | Kamlukin | 192/13 R X |
| 3,433,087 | 3/1969 | Winter et al. | 74/471 X |
| 3,541,876 | 11/1970 | Gressard | 74/471 R |
| 3,583,535 | 6/1971 | Plamper | 74/481 X |
| 3,645,368 | 2/1972 | Blaauw | 74/481 X |
| 3,993,175 | 11/1976 | Beveridge | 74/473 R X |
| 4,128,017 | 12/1978 | Clarke | 474/38 |
| 4,132,121 | 1/1979 | Clarke | 474/27 |

Primary Examiner—George H. Krizmanich
Attorney, Agent, or Firm—Jenkins, Coffey, Hyland, Badger & Conard

[57] ABSTRACT

A combination speed control and transmission forward-reverse control for a lawn tractor, or the like, having an engine including a drive shaft and output pulley, a transmission including a driven input shaft and pulley, and a belt-tensioning, or other similar type clutch. The control includes an actuating lever mounted on the tractor chassis, and control cables extending between the actuating lever and the clutch, and between the actuating lever and the transmission forward-reverse shift linkage. Movement of the actuating lever in the forward direction shifts the transmission linkage to the forward position and releases the clutch to engage the driving and driven pulleys with one another. Further forward motion of the actuating lever causes a greater coupling of the driving and driven pulleys to cause the lawn tractor to move forward faster. Returning of the actuating lever to a neutral position disengages the clutch and moves the transmission shift linkage to neutral. Movement of the actuating lever in a reverse direction shifts the transmission linkage into reverse gear, and couples the driving and driven pulleys together. Further reverse movement of the actuating lever causes greater coupling of the driving and driven pulleys to move the lawn tractor faster in reverse. The actuating lever is also coupled to the vehicle brake. Application of the brake causes the actuating lever, and the transmission and clutch which are controlled by it, to move to neutral. Similarly, movement of the actuating lever to neutral, in addition to disengaging the clutch and moving the transmission to the neutral position, causes the brake to be applied.

24 Claims, 9 Drawing Figures

FIG. 6

COMBINATION VEHICLE SPEED AND DIRECTION CONTROL

This invention relates to drive mechanisms and control mechanisms for vehicles, such as lawn tractors and the like. Particularly, this invention relates to a control mechanism which incorporates both speed and directional functions into a single control for a such a vehicle.

Typically, a lawn tractor or like vehicle has an engine, a transmission, a V-belt coupling, or the like, between the engine and transmission, and a clutch mechanism for controlling tension on the V-belts of the coupling. The clutch mechanism of the lawn tractor may be any of a large number of known types. For example, there are the double pulley, variable ratio sheave clutches described in Clarke U.S. Pat. Nos. 4,132,121; 4,128,017; and 4,176,560. Other types of speed-control assemblies are described in the various references cited in the above-identified patents.

For purposes of illustration, the single control mechanism of the instant invention will be disclosed in connection with the variable speed drive assembly of the above-identified Clarke U.S. Pat. No. 4,128,017. It is understood that the single control mechanism of this invention is adaptable for use with a very large number of different clutch mechanisms, or may be used directly as an engine throttle control if desired.

It is an object of the present invention to provide a control mechanism for a vehicle, such as a lawn tractor or the like, which includes a single control for both controlling the direction in which the vehicle moves (i.e., forward or reverse), and also the speed at which the vehicle moves in the selected direction.

According to the invention, a vehicle has a power shaft having an idle speed and a range of low to high speeds for vehicle operation, a transmission having a neutral position, a forward gear and a reverse gear, and means for coupling the power shaft to the transmission. The vehicle further includes a combination vehicle speed and direction control comprising an actuating lever mounted for movement on the vehicle, first means for coupling the actuating lever to the transmission, second means for coupling the actuating lever to the power shaft, with the actuating lever having a neutral position in which the transmission is in neutral and the power shaft is at idle. Movement of the actuating lever from the neutral position in a first direction moves the transmission into the forward gear and the power shaft into the range of operating speeds. Movement of the actuating lever in a second direction moves the transmission into reverse gear and the power shaft into the range of operating speeds.

In the illustrative embodiment, the power shaft is a sheave of a double-pulley, variable ratio clutch, the clutch including a range of low to high speed operating positions and a disengaged idle position.

Further according to the illustrative embodiment, the vehicle includes a brake and a brake lever. Actuation of the brake lever moves the brake to a braking position. Additionally, means are coupled between the brake lever and the actuating lever, such that actuation of the brake lever moves the actuating lever to the neutral position. Similarly, movement of the actuating lever to the neutral position actuates the brake.

The invention may best be understood by referring to the following description and accompanying drawings which illustrate the invention.

In the drawings:

FIG. 7 is a fragmentary sectional view taken generally along section lines 7—7 of FIG. 6;

FIG. 8 is a fragmentary sectional view taken generally along section lines 8—8 of FIG. 6; and, FIG. 9 is a fragmentary sectional view taken generally along section lines 9—9 of FIG. 3.

Figures 1, 2, 3, 4:
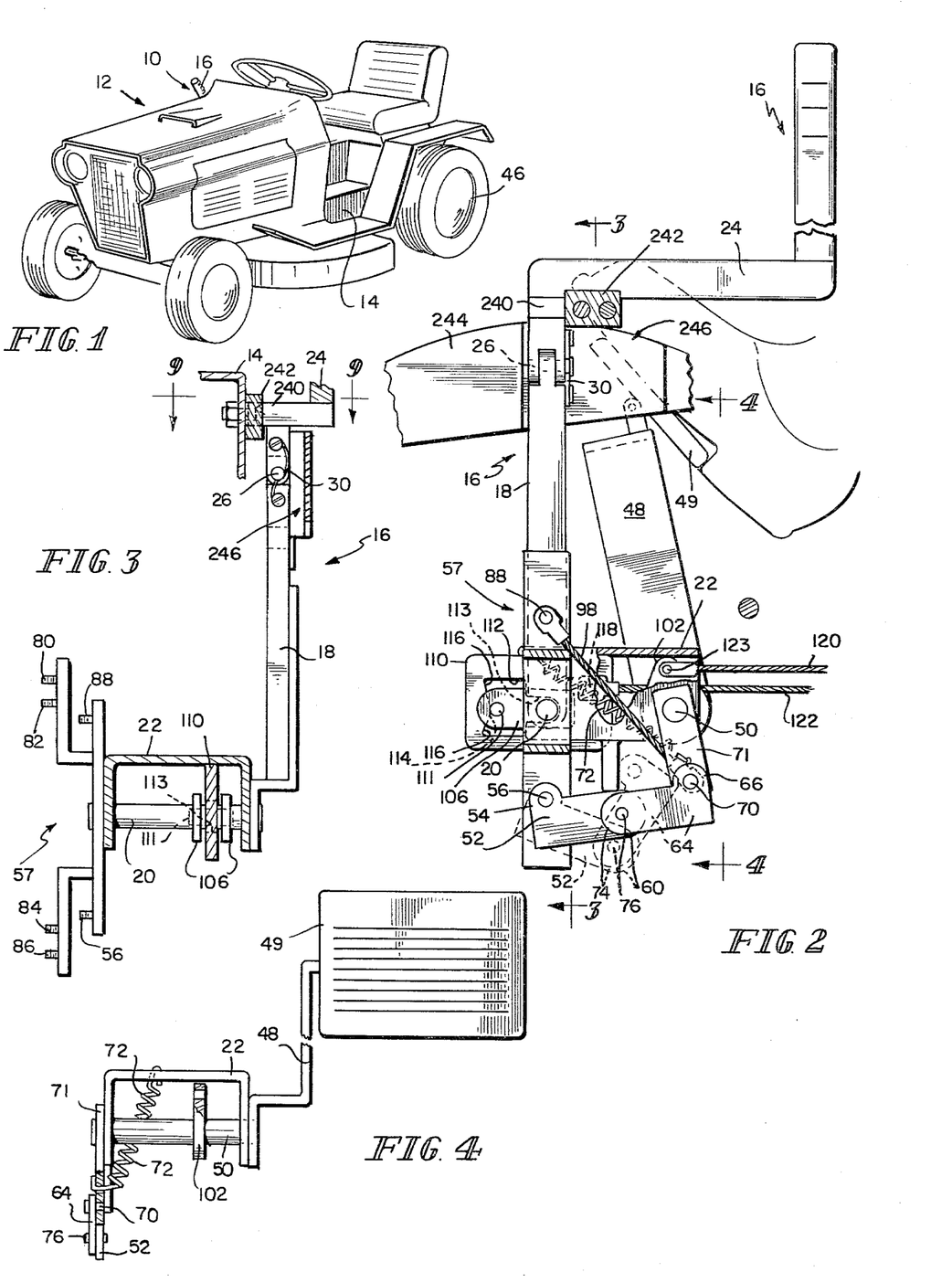
FIG. 1 is a perspective view of a vehicle in connection with which the present invention can be used.
FIG. 2 is a fragmentary sectional side elevational view of a control assembly for vehicle speed and direction.
FIG. 3 is a fragmentary sectional view taken generally along section lines 3—3 of FIG. 2.
FIG. 4 is a sectional view of a portion of the assembly of FIG. 2, taken generally along section lines 4—4 thereof.

With particular reference now to FIG. 1, a single control 10 for speed and direction (i.e., forward or reverse) is mounted on a vehicle 12, such as a lawn tractor. Vehicle 12 includes a chassis 14 upon which is mounted an actuating lever 16 for control 10. Actuating lever 16, accessible to the vehicle 12 operator, controls both whether the vehicle 12 is travelling in a forward direction or a reverse direction, and the vehicle speed in that direction.

Referring now more particularly to FIGS. 2-3, actuating lever 16 includes a lower part 18 pivotally mounted by means of a pin 20 from a bracket 22 provided on chassis 14. Actuating lever 16 further includes an upper part 24 pivotally mounted by means of a pin 26 (see also FIG. 9) and urged by a wire spring 30 into its position with respect to lower part 18 illustrated in FIGS. 2-3.

Actuating lever 16 controls a clutch assembly 32 (FIGS. 5-8), such as, for example, the clutch assembly described in detail in the aforementioned U.S. Pat. No. 4,128,017. Actuating lever 16 also controls a transmission assembly such as, for example, the combination transmission-differential-axle assembly described in detail in the aforementioned U.S. Pat. No. 4,128,017.

It will suffice for the present to understand that the clutch assembly 32 (see FIGS. 5-8) controls what portion of the power supplied by an engine drive shaft 40 (see FIGS. 5-6) is transmitted to the transmission 36 input shaft 42 (see FIGS. 5-7), and thus the speed of the vehicle 12 drive wheels 46 (see FIG. 1), illustratively the rear wheels.

The vehicle 12 further includes a brake lever 48 (see FIGS. 2, 4). Illustratively, brake lever 48 supports a foot-actuated pedal 49. Brake lever 48 is also pivotally mounted by means of a pivot pin 50 from bracket 22.

Brake lever 48 is coupled to, and operates in conjunction with, the actuating lever 16. The coupling mechanism includes a first linkage lever 52 (see FIGS. 2 and 5) having a first end 54 pivotally coupled at attachment point 56 (FIGS. 2-3) to a bracket 57 mounted upon pin 20 and movable by actuating lever 16. First linkage lever 52 also includes a second end 60. A second linkage lever 64 is pivotally attached at its first end 66 to a pivot point 70 provided on an arm 71 mounted on pivot pin 50 for movement with brake lever 48. Brake lever 48 and brake pedal 49 are urged into their undepressed (non-applied) positions by a tension spring 72 extending between bracket 22 and arm 71. Second linkage lever 64 is provided with a second end 74. The second ends 60, 74 of linkage levers 52, 64, respectively, are pivotally coupled by a pivot pin 76.

Bracket 57 further includes attachment points 80, 82, 84, 86, 88. Flexible cables 90, 92, 94, 96, 98 (FIG. 5) are attached at one end, respectively, to points 80, 82, 84, 86, 88. The other end of flexible cable 98 is attached to pivot point 70 associated with brake lever 48, as best illustrated in FIG. 2. The other cables 90, 92, 94, 96 extend rearwardly to control the clutch mechanism 32 and transmission assembly 36, as will be discussed.

A brake cable lever 102 is attached to pivot pin 50 beneath bracket 22. Brake cable lever 102 moves with brake lever 48. A flexible brake control cable 120 is attached at 123 to brake cable lever 102. See FIGS. 2, 4, and 5. Axially spaced-apart neutral brake plate positioning ears 106 are attached to pivot pin 20 for movement with the actuating lever 16. See FIGS. 2, 3, and 6. A neutral brake plate 110 is positioned between ears 106 on pivot pin 20. Ears 106 are connected at their ends remote from pivot pin 20 by a pin 111. Pin 111 moves within an opening 112 provided in the neutral brake plate 110 as actuating lever 16 pivots. Opening 112 includes a positioning notch region 113 which accommodates pivot pin 20, a brake application land region 114, and, on either side of the brake application land region 114, a ramp-like brake release region 116. Neutral brake plate 110 further includes an attachment point 118 for a flexible brake control cable 122. Cables 120, 122 extend rearwardly from the brake cable lever 102 and neutral brake plate 110, respectively, to turnbuckles 124. Turnbuckles 124, in turn, are attached to a brake actuating lever 126 associated with a brake mechanism (not shown). See FIG. 5. The brake mechanism may be of any suitable type, such as that illustrated and described in detail in the aforementioned U.S. Pat. No. 4,128,017.

Figure 5:
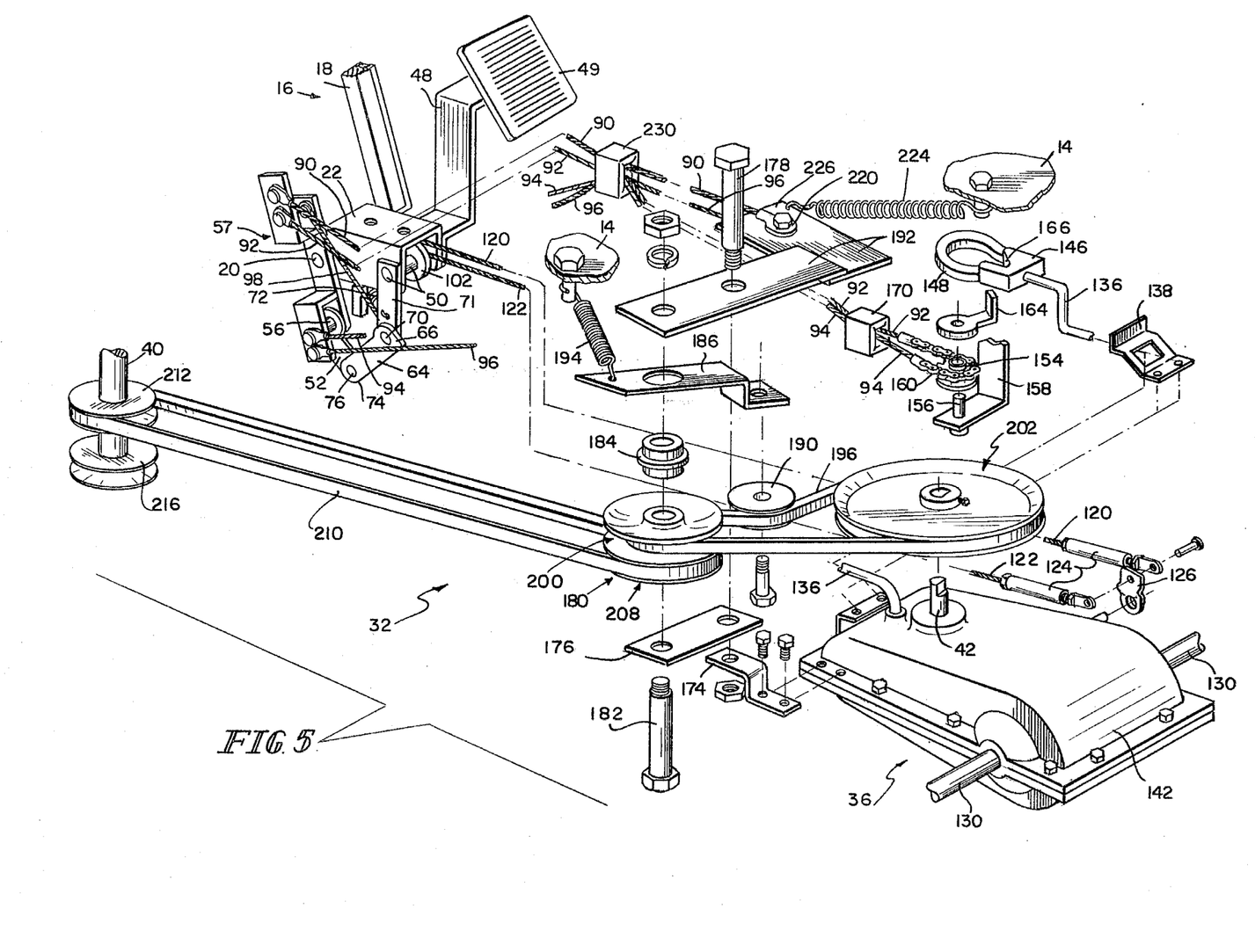
FIG. 5 is a fragmentary perspective view, partly assembled and partly exploded, showing the interrelationships of various components of the speed control assembly.
Figure 6:
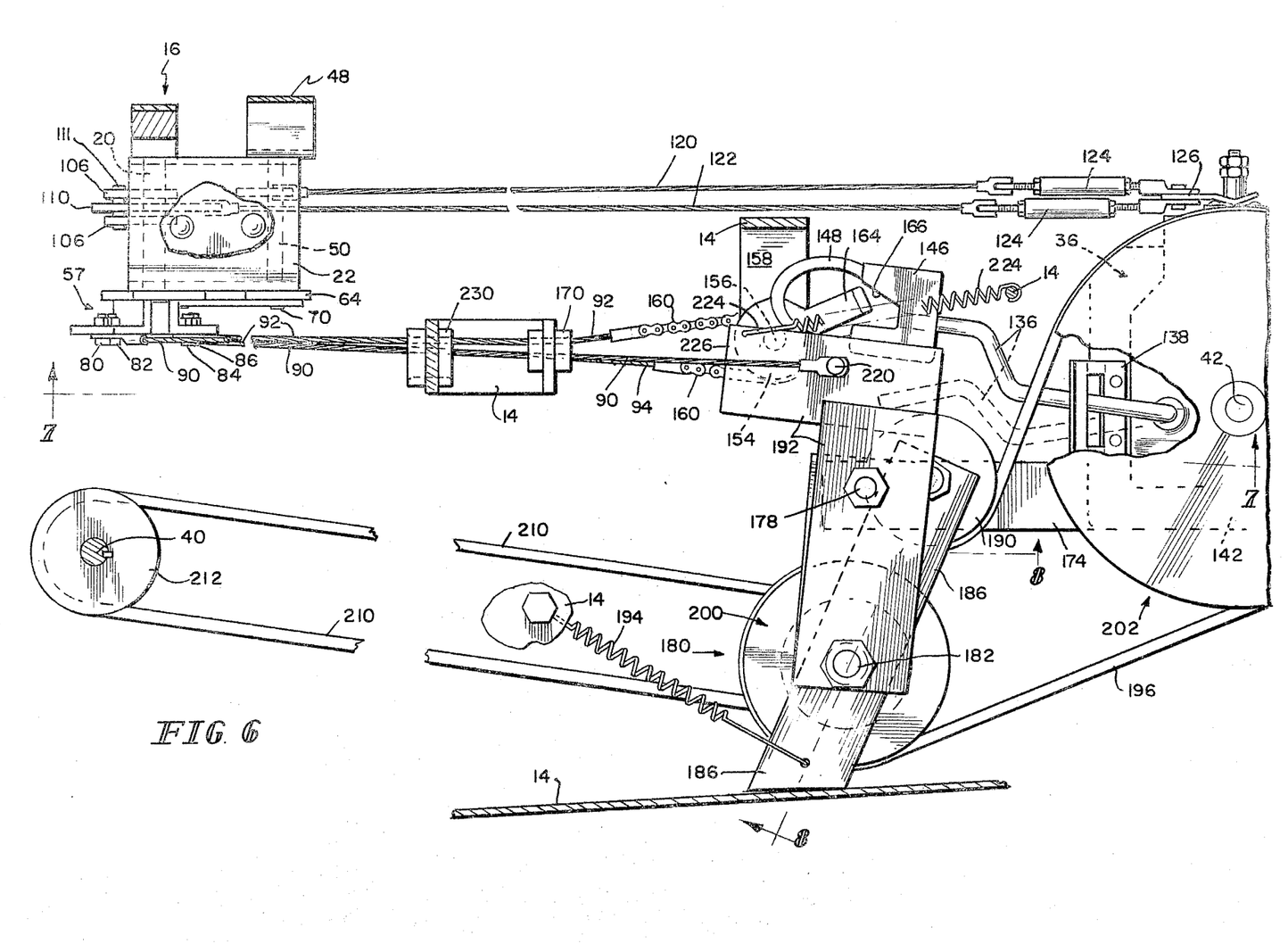
FIG. 6 is a top plan view of the assembly illustrated in FIG. 5.
Figures 7, 8, 9:
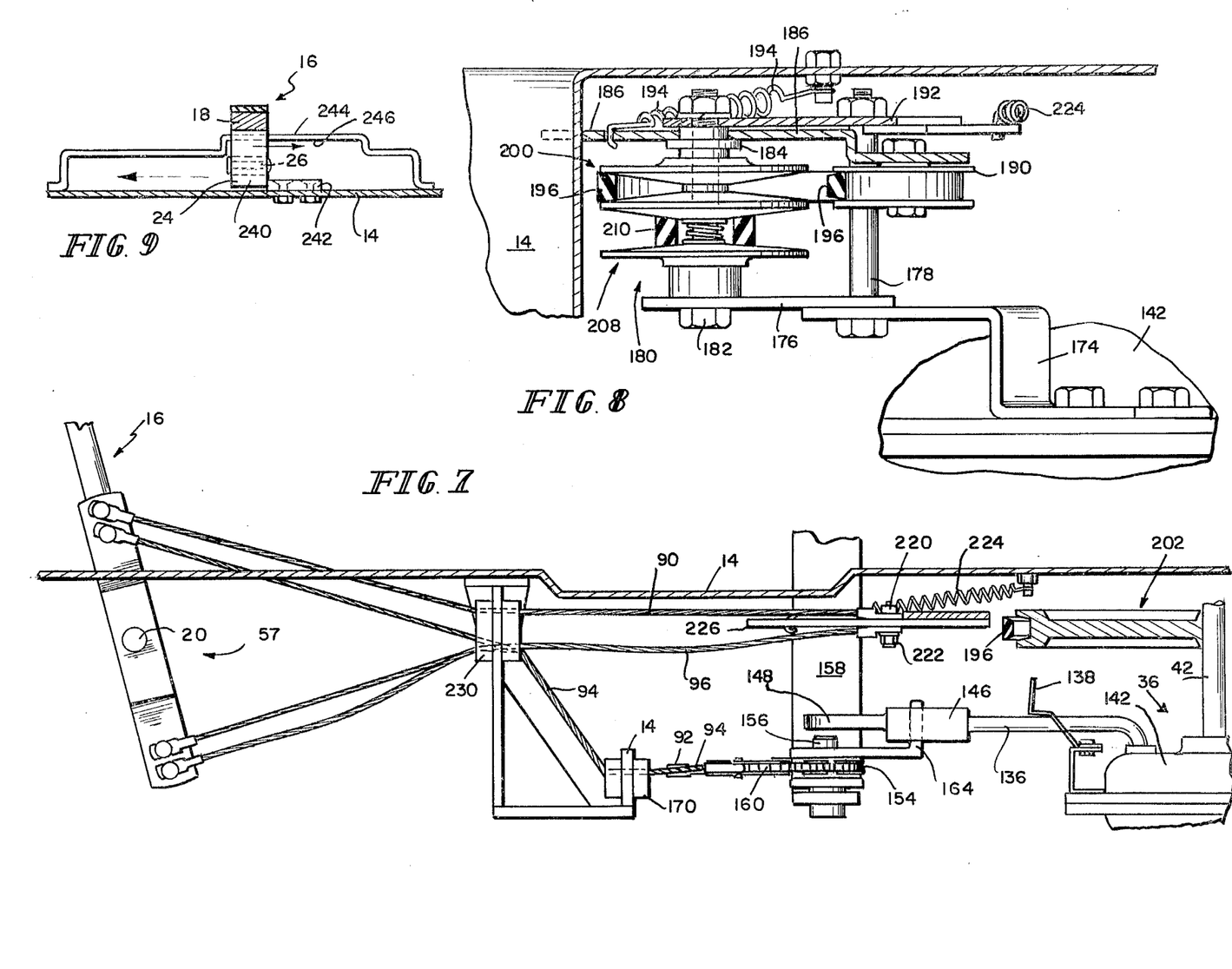

Turning now more specifically to FIGS. 5–7, the illustrated transmission assembly 36 is combined with a differential for the axles 130 to which are attached the rear driving wheels 46 of the vehicle 12 (see FIG. 1). The transmission assembly 36 includes a shift lever 136 movable in one direction to place the transmission 36 in a forward gear and in the other direction to place the transmission 36 in a reverse gear. Lever 136 extends through a travel limit bracket 138 mounted on the case 142 of transmission 36. A shift cam 146 is mounted on the end of lever 136 remote from the transmission case 142. Shift cam 146 includes a constant engagement loop 148 which prevents the linkage to lever 136 from becoming inadvertently disengaged.

A toothed transmission shift sprocket 154 is rotatably mounted on a pin 156 provided on a bracket 158 on chassis 14. A length of roller chain 160 is trained about sprocket 154, and the free ends of flexible cables 92, 94 are coupled to the ends of the chain 160. A shift actuator 164, which is rotatable with the sprocket 154 about pin 156, projects into the loop 146 and engages a cam surface 166 of the shift cam 146. Cables 92, 94 extend through a cable guide 170 mounted on chassis 14.

Turning now to the clutch assembly 32, a support bracket 174 is provided on the transmission case 142. See FIGS. 5–6 and 8. Bracket 174 pivotally supports a lower arm 176, attached to the support bracket 174 by a mounting bolt 178 which permits free pivotal movement of arm 176 with respect to bracket 174. Lower arm 176 supports a double-pulley variable ratio sheave assembly 180 rotatably on a bolt 182. Bolt 182 also supports a combination spacer and bearing 184 which separates the variable ratio sheave assembly 180 from a rotatably mounted idler arm 186. An idler pulley 190 is supported on the end of arm 186. An upper arm 192 is mounted for movement with the lower arm 176, and is fixed in relation to arm 176 by the bolts 178, 182. Bolt 178 also limits the travel of idler arm 186 about bolt 182. A tensioning spring 194 between the chassis 14 and idler arm 186 urges the idler pulley 190 generally away from bolt 178 to tension a V-belt 196 trained about the upper pulley 200 of the double-pulley variable-ratio sheave assembly 180, idler pulley 190, and the driven pulley 202 mounted on the input shaft 42 of transmission 36. The lower pulley 208 of double-pulley variable-ratio sheave assembly 180 is coupled by means of a V-belt 210 to a pulley 212 connected to the vehicle 12 engine drive shaft 40. An additional pulley 216 is provided on engine drive shaft 40 as a power take-off for another load, such as one or more rotary lawn mower blades (not shown).

The upper arm 192 of clutch assembly 32 is somewhat L-shaped and includes attachment points 220, 222 for flexible cables 90, 96, as well as an attachment point for a tensioning spring 224 which is stretched between the chassis 14 and the end 226 of arm 192 opposite the sheave assembly 180. Flexible cables 90, 92, 94, 96 are threaded through a cable guide 230 mounted on chassis 14.

Returning briefly to FIGS. 2–3, and considering also FIG. 9, the upper part 24 of actuating lever 16 is provided with a projection 240 which extends inwardly toward the vehicle 12 chassis 14. A reverse lock-out stop 242 on the chassis 14 projects into interferring relationship with projection 240. Stop 242 is positioned on the chassis 14 to correspond to the neutral orientation of actuating lever 16, to prevent actuating lever 16 from inadvertently being moved through the neutral orientation from a forward speed to a reverse speed or vice versa. A gate 244 with an offset or "stepped" region 246 is provided on the chassis 14. The space between the gate 244 and the reverse lock-out stop 242 permits movement of the actuating lever 16 in either direction past the reverse lock-out stop 242. However, such movement past the reverse lock-out stop 242 is only permitted if the upper part 24 of actuating lever 16 is first pivoted about hinge pin 26 out of the path of the reverse lock-out stop 242 and then released to permit the spring 30 to bring the upper part 24 back into the space on the other side of the reverse lock-out stop 242.

In operation, it will be appreciated that if the actuating lever 16 is in the position illustrated in FIG. 2, the upper arm 192 is urged rearwardly by the tensioning spring 224. This pivots the arm 192 clockwise (toward the right in FIG. 6) about the mounting bolt 178 to move the sheave assembly 180 inwardly to reduce the tension on belt 196. In this position, the sheave assembly 180 is moved toward a line passing through the axial centers of the driving and driven pulleys 212 and 202, so that both of the V-belts 210 and 196, are drivingly disengaged from the sheave assembly 180 and their respective pulley 212, 202, respectively. Thus, the drive system is in a double declutched disengaged position. As the actuating lever 16 is moved forward (i.e., toward the left in FIG. 2), flexible cable 90 will pull end 226 of arm 192 forward (toward the left in FIG. 6). This pivots the arm 192 in a counterclockwise direction about the mounting bolt 178 to move the sheave assembly 180 outwardly generally away from the line passing through the axial centers of the driving and driven pulleys 212 and 202. In this manner, belts 210 and 196 are smoothly and substantially simultaneously placed under driving tension. Further forward movement of the actuating lever 16 will tend to increase the tension on belt 210 and reduce the tension on belt 196, causing the variable ratios of pulleys 200, 208 of the variable-ratio sheave 180 to be adjusted such that the effective diameter of pulley 208 is reduced and the effective diameter of pulley 200 is increased. This will result in an increased rotation rate in the pulley 202 and input shaft 42 of the transmission 36. The speed of the vehicle 12 will thereby be increased. Similarly, as actuating lever 16 is pulled rearwardly (toward the right in FIG. 2), flexible cable 96 will pull end 226 of upper arm 192 of the clutch assembly 32 forward. This will have the same effect on the double-pulley variable ratio sheave assembly 180 as did pulling on flexible cable 90, i.e., to increase the speed of vehicle 12.

The direction in which the vehicle 12 is moving as its speed is increased or reduced is determined by cables 92, 94. If the actuating lever is pushed forward (toward the left in FIG. 2), flexible cable 92 is tensioned while flexible cable 94 is slackened, causing the shift actuator 164 to move counterclockwise as viewed in FIG. 6. The movement of the shift actuator 164 along the cam surface 166 of shift cam 146 moves the shift lever 136 into the position illustrated in solid lines in FIG. 6, placing the transmission 36 in the forward gear. This means that as the top of the actuating lever 16 is moved forward (toward the left in FIG. 2), the vehicle 12 first begins to move slowly forward, with the speed of vehicle 12 being determined by how far forward the actuating lever 16 is pushed.

Assuming that the upper part 24 of the actuating lever 16 is pivoted outward about the pin 26 such that projection 240 clears the reverse lock-out stop 242, the top of actuating lever 16 can be moved rearwardly (toward the right in FIG. 2). This causes cable 94 to be tensioned and cable 92 to be slackened, rotating shift actuator 164 clockwise as viewed in FIG. 6. This movement causes the shift actuator 164 to engage the cam surface 166 of shift cam 146 and move the shift lever 136 of transmission 36 to the position illustrated in broken lines in FIG. 6, placing the transmission 36 in reverse gear. The vehicle 12 first begins to move slowly in reverse, with the speed of the vehicle 12 in reverse increasing as the actuating lever 16 is pulled further rearwardly.

As added safety features, the actuating lever 16 and brake lever 48 are interconnected so that movement of the actuating lever 16 to the neutral orientation illustrated in FIG. 2 causes the brake to be applied. Further, application of the brake by the operator's depressing of the brake pedal 49 causes the actuating lever 16 to move to the neutral orientation. This interaction is achieved as follows. First, depression of the brake pedal 49 pivots the brake lever 48 counterclockwise as viewed in FIG. 2. This also causes arm 71 to pivot counterclockwise. If the actuating lever 16 is in the forward orientation, such counterclockwise movement of arm 71 increases the tension on cable 98, causing actuating lever 16 to move into the neutral orientation. On the other hand, if actuating lever 16 is in the reverse orientation, such counterclockwise movement of arm 71 is coupled directly through the linkage levers 52, 64. Actuating lever 16 is moved forward until projection 240 encounters the reverse lock-out stop 242. In this position, the clutch assembly 32 is disengaged. Such counterclockwise movement of the brake lever 48 is transmitted through the brake cable lever 102 and brake cable 120 to the brake actuating lever 126 to brake the transmission 36, and thus the vehicle 12, to a stop.

Finally, the turnbuckle 124 associated with brake actuating cable 122 is adjusted such that, when the actuating lever 16 is in its position illustrated in FIG. 2 (i.e., the neutral orientation), the brake associated with actuating lever 126 is applied. Movement of the actuating lever 16 in either direction from the orientation illustrated in FIG. 2 causes the pin 111 to move from the brake application land region 114 of opening 112 into one of the brake release regions 116, permitting cable 122 to slacken and releasing the brake. Of course, movement of the actuating lever 16 back into its neutral orientation illustrated in FIG. 2 causes pin 111 to move onto land region 114. This causes tension to increase on the flexible cable 122 and the brake to be reapplied.

What is claimed is:

1. A vehicle having an engine driving a clutch assembly having a disengaged position and a range of low to high speed operating positions, the clutch assembly driving a transmission having a neutral position, a forward gear and a reverse gear, and a combination vehicle speed and direction control including an actuating lever mounted for movement on the vehicle, first means for coupling the actuating lever to the transmission, second means for coupling the actuating lever to the clutch assembly, the actuating lever having a neutral position in which the transmission is in neutral and the clutch assembly is in said disengaged position, a first movement of the actuating lever from the neutral position moving the transmission into said forward gear and the clutch assembly into the range of operating positions, and a second movement of the actuating lever moving the transmission into the reverse gear and the clutch assembly into the range of operating positions.

2. The apparatus of claim 1 wherein the clutch assembly comprises a variable ratio sheave assembly.

3. The apparatus of claim 1 and further comprising a brake lever, actuation of the brake lever moving the actuating lever to the neutral position.

4. The apparatus of claim 3 and further comprising third means for coupling the actuating lever to the brake lever.

5. The apparatus of claim 4 wherein the third means comprises a first linkage lever having first and second ends and a second linkage lever having first and second ends, the first end of the first lever being movably coupled to the actuating lever, the first end of the second linkage lever being movably coupled to the brake lever, and the second ends of the first and second linkage lever being movably coupled together.

6. The apparatus of claim 5 and further comprising a vehicle brake and means for coupling the brake to the brake lever such that actuation of the brake lever applies the brake.

7. The apparatus of claim 1 and further including a gate mounted on the vehicle for selectively prohibiting actuating lever movement in either direction past the neutral position.

8. The apparatus of claim 1 wherein the first means comprises a first flexible element coupled to the actuating lever at a first point and a second flexible element coupled to the actuating lever at a second point spaced from the first point.

9. The apparatus of claim 8 wherein the actuating lever is pivotally mounted in the vehicle chassis and the first and second points are on opposite sides of the actuating lever pivot axis.

10. The apparatus of claim 1 wherein the second means comprises a third flexible element coupled to the actuating lever at a third point and a fourth flexible element coupled to the actuating lever at a fourth point spaced from the third point.

11. The apparatus of claim 10 wherein the actuating lever is pivotally mounted in the vehicle chassis and the third and fourth points are on opposite sides of the actuating lever pivot axis.

12. The apparatus of claim 5 wherein the third means further comprises a fifth flexible element coupled to the actuating lever and to the brake lever.

13. The apparatus of claim 1 including a driving pulley on the engine shaft, and a driven pulley on the transmission shaft, the variable ratio sheave assembly including a first belt reeved about the driving pulley and sheave assembly, a second belt reeved about the driven pulley and sheave assembly, fourth means carrying said sheave assembly, and fifth means movably supporting the fourth means, the second means for shifting the position of said fourth means and sheave assembly with respect to said driving and driven pulleys for altering the drive ratio of said sheave assembly through said range of low to high speed operating positions.

14. The apparatus of claim 1 wherein the transmission includes a shift lever having a first end for shifting the transmission and a second end supporting a follower, the vehicle further including means on the vehicle chassis for rotatably supporting a sprocket, a shift actuator mounted for movement with the sprocket, the shift actuator engaging the follower, and a length of chain engaging the sprocket teeth, the length of chain having an end coupled to the first means, movement of the actuating lever to the forward gear position rotating the sprocket in a first direction to cause the shift actuator to move the follower and shift lever to shift the transmission into said forward gear, and movement of the actuating lever to the reverse gear position rotating the sprocket in the second and opposite direction to cause the shift actuator to move the follower and shift lever to shift the transmission into said reverse gear.

15. A vehicle having an engine driving a variable speed sheave assembly having a disengaged position and a range of low to high speed operating positions, the variable speed sheave assembly driving a transmission having a neutral position, a forward gear and a reverse gear, and a combination vehicle speed and direction control including an actuating lever mounted for movement on the vehicle, a brake lever, first and second linkage levers, each having a first end movably coupled respectively to the actuating lever and the brake lever, a second end of each of the first and second linkage levers being pivotally coupled together, first means for coupling the actuating lever to the transmission, second means for coupling the actuating lever to the variable ratio sheave assembly, and third means for coupling the actuating lever to the brake lever, the actuating lever having a neutral position in which the transmission is in neutral and the variable speed sheave assembly is in said disengaged position, movement of the actuating lever from the neutral position in a first direction moving the transmission into said forward gear and the variable ratio sheave assembly into the range of operating positions, movement of the actuating lever in a second and opposite direction moving the transmission into the reverse gear and the variable ratio sheave assembly into the range of operating positions, and actuation of the brake lever moving the actuating lever to the neutral position.

16. A vehicle having an engine driving a double pulley variable ratio sheave assembly having a disengaged position and a range of low to high speed operating positions, the variable ratio sheave assembly driving a transmission with a neutral position and reverse and forward gears, and a combination vehicle speed and transmission control including an actuating lever mounted for movement on the vehicle chassis, a brake lever, first and second linkage levers, the first linkage lever having a first end pivotally coupled to the actuating lever, the second linkage lever having a first end pivotally coupled to the brake lever, and the first and second linkage levers having second ends pivotally coupled to one another, a first flexible element having a first end coupled to the actuating lever at a first point along the actuating lever and a second end coupled to the actuating lever at a second point spaced from the first point, the flexible element extending from the actuating lever to the transmission and being coupled to the transmission such that movement of the actuating lever in one direction shifts the transmission into a forwrd gear and movement of the actuating lever in another direction shifts the transmission into a reverse gear, a second flexible element having a first end coupled to the actuating lever at a third point along the actuating lever and a second end coupled to the actuating lever at a fourth point spaced from the third point, the second flexible element extending from the actuator to the variable ratio sheave assembly to vary the drive speed of the transmission between a disengaged position and a range of low to high speed operating positions, and a third flexible element having a first end coupled to the actuating lever at a point along the actuating lever and a second end coupled to the brake lever, the first and second linkage levers and third flexible element cooperating such that movement of the brake lever to a position for stopping motion of the vehicle causes the actuating lever to move the first flexible element to a position corresponding to the transmission neutral position, and the second flexible element to a position corresponding to the variable ratio sheave disengaged position.

17. A vehicle having an engine driving a clutch assembly having a disengaged position and a range of low to high speed operating positions, the clutch assembly driving transmission having a neutral position, a forward gear and a reverse gear, and a combination vehicle speed and direction control including an actuating lever mounted for movement on the vehicle, a brake lever, linkage means having a first end movably coupled to the actuating lever and a second end movably coupled to the brake lever, first means for coupling the actuating lever to the transmission, second means for coupling the actuating lever to the clutch assembly, the actuating lever having a neutral position in which the transmission is in neutral and the clutch assembly is in said disengaged position, movement of the actuating lever from the neutral position in a first direction moving the transmission into said forward gear and the clutch assembly into the range of operating positions, movement of the actuating lever in a second direction moving the transmission into the reverse gear and the clutch assembly into the range of operating positions, and actuation of the brake lever moving the actuating lever to the neutral position.

18. The apparatus of claim 17 and further comprising a brake for braking vehicle movement, means for coupling the brake lever to the brake such that actuation of the brake lever causes the brake to be applied, and means for coupling the actuating lever to the brake such that movement of the actuating lever to move the transmission to the neutral position causes the brake to be applied.

19. The apparatus of claim 18 wherein the second means for coupling the actuating lever to the brake includes a neutral brake plate providing an opening, the opening including means for mounting the neutral brake plate for sliding movement relative to the actuating lever, movement of the actuating lever from the neutral position causing sliding movement of the neutral brake plate to release the brake, movement of the actuating lever to the neutral position causing sliding movement of the neutral brake plate to apply the brake.

20. A vehicle including an engine, a power shaft coupled to the engine and having an idle and a range of low to high speeds for vehicle operation, a transmission having a neutral position, a forward gear position and a reverse gear position, means for coupling the power shaft to the transmission, and a combination vehicle speed and direction control comprising an actuating lever mounted for movement on the vehicle, first means for coupling the actuating lever to the transmission, second means for coupling the actuating lever to the power shaft, the actuating lever having a neutral position corresponding to the power shaft idle and the transmission neutral position, and a range of vehicle low to high speed operating positions in which the power shaft is in said range of low to high speeds for vehicle operation and the transmission is in one of said forward and reverse gear positions, movement of the actuating lever in a first direction from its neutral position moving the transmission into said forward gear position and the power shaft into a speed within the range of speeds for vehicle operation, and movement of the actuating lever in a second direction from its neutral position moving the transmission into said reverse gear position and the power shaft into a speed within the range of speeds for vehicle operation.

21. The apparatus of claim 20 wherein the power shaft is an engine-driven sheave of a multiple pulley variable ratio sheave assembly.

22. The apparatus of claim 21 and further comprising a vehicle brake for braking vehicle motion, and means for coupling the actuating lever to the brake such that movement of the actuating lever to the neutral position causes the brake to be applied to brake vehicle motion.

23. A vehicle having an engine driving a clutch assembly having a disengaged position and a range of low to high speed operating positions, the clutch assembly driving a transmission having a neutral position, a forward gear and a reverse gear, and a combination vehicle speed and direction control including an actuating lever mounted for movement on the vehicle, first means for coupling the actuating lever to the transmission, second means for coupling the actuating lever to the clutch assembly, the actuating lever having a neutral position in which the transmission is in neutral and the clutch assembly is in said disengaged position, movement of the actuating lever in a first direction from the neutral position moving the transmission into said forward gear and the clutch assembly into an engaged position within the range of operating positions, and movement of the actuating lever in a second direction moving the transmission into the reverse gear and the clutch assembly into an engaged position within the range of operation positions.

24. A vehicle having an engine driving a clutch assembly having a disengaged position and a range of low to high speed operating positions, the clutch assembly driving a transmission having a neutral position, a forward gear and a reverse gear, and a combination vehicle speed and direction control including an actuating lever mounted for movement on the vehicle, first means for coupling the actuating lever to the transmission, second means for coupling the actuating lever to the clutch assembly, the actuating lever having a neutral position in which the transmission is in neutral and the clutch assembly is in said disengaged position, a first movement of the actuating lever from the neutral position coincidentally moving the transmission into said forward gear and the clutch assembly into a position within the range of operating positions, and a second movement of the actuating lever coincidentally moving the transmission into the reverse gear and the clutch assembly into a position within the range of operating positions.

* * * * *

UNITED STATES PATENT AND TRADEMARK OFFICE
CERTIFICATE OF CORRECTION

PATENT NO. : 4,301,902
DATED : November 24, 1981
INVENTOR(S) : Stephen L. Gatsos and Jerry A. Gardner It is certified that error appears in the above-identified patent and that said Letters Patent are hereby corrected as shown below:

Column 6, line 44 (Claim 2, line 1) should read -- The apparatus of claim 1 or 23 wherein the clutch assem- --; line 46 (Claim 3, line 1) should read -- The apparatus of claim 1 or 23 and further comprising a --; line 65 (Claim 7, line 1) should read -- The apparatus of claim 1 or 23 and further including a --.

Column 7, line 1 (Claim 8, line 1) should read -- The apparatus of claim 1 or 23 wherein the first means --; line 10 (Claim 10, line 1) should read -- The apparatus of claim 1 or 23 wherein the second --; line 22 (Claim 13, line 1) should read -- The apparatus of claim 1 or 23 including a driving pul- --; line 34 (Claim 14, line 1) should read -- The apparatus of claim 1 or 23 wherein the transmission --.

Column 8, line 56 (Claim 17, line 4), after "driving" insert -- a --.

Signed and Sealed this

First Day of June 1982

[SEAL]

Attest:

Attesting Officer

GERALD J. MOSSINGHOFF
Commissioner of Patents and Trademarks